United States Patent
Ma et al.

(10) Patent No.: US 9,888,301 B2
(45) Date of Patent: Feb. 6, 2018

(54) OPTICAL SIGNAL CONTROL METHOD AND APPARATUS, AND OPTICAL SWITCH MATRIX CONTROL METHOD AND APPARATUS

(71) Applicant: Huawei Technologies Co., Ltd., Shenzhen (CN)

(72) Inventors: Huixiao Ma, Shenzhen (CN); Kun Zhu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 32 days.

(21) Appl. No.: 15/194,231

(22) Filed: Jun. 27, 2016

(65) Prior Publication Data

US 2016/0309244 A1    Oct. 20, 2016

Related U.S. Application Data

(63) Continuation of application No. PCT/CN2013/090765, filed on Dec. 27, 2013.

(51) Int. Cl.
*H04J 14/00*    (2006.01)
*H04Q 11/00*    (2006.01)

(52) U.S. Cl.
CPC . *H04Q 11/0005* (2013.01); *H04Q 2011/0035* (2013.01); *H04Q 2011/0039* (2013.01);
(Continued)

(58) Field of Classification Search
CPC ....... H04Q 11/0005; H04Q 2011/0058; H04Q 2011/0047; H04Q 2011/0039; H04Q 2011/0035; H04Q 2213/1301
(Continued)

(56) References Cited

U.S. PATENT DOCUMENTS

2003/0016687 A1* 1/2003 Hill ..................... H04L 49/1515
                                                              370/414
2003/0063841 A1    4/2003 Shiozawa et al.
(Continued)

FOREIGN PATENT DOCUMENTS

CN    1527526 A    9/2004
CN    101877799 A    11/2010
(Continued)

OTHER PUBLICATIONS

Okuno et al., "8×8 Optical Matrix Switch Using Silica-Based Planar Lightwave Circuits," IEICE Trans. Electron, vol. E76-C, pp. 1215-1222, The Institute of Electronics, Information, and Communication Engineers (Jul. 1993).
(Continued)

*Primary Examiner* — Juan A Torres
(74) *Attorney, Agent, or Firm* — Leydig, Voit & Mayer, Ltd.

(57) ABSTRACT

The present invention discloses an optical signal control method and apparatus, and an optical switch matrix control method and apparatus. A first optical coupler performs optical coupling processing on an optical signal input from an input port, to split the optical signal into two paths of optical signals; a phase shifter performs phase processing on the two paths of optical signals, so that a phase difference exists between the two paths of optical signals on which phase processing has been performed; and a second optical coupler performs optical coupling processing on the two paths of optical signals between which the phase difference exists, to output an optical signal from a first output port and/or a second output port. In this way, a problem of a low reaction speed of an existing optical switch cell that exists when the optical switch cell implements optical signal broadcast can be resolved.

19 Claims, 8 Drawing Sheets

(52) U.S. Cl.
CPC ............ *H04Q 2011/0047* (2013.01); *H04Q 2011/0058* (2013.01); *H04Q 2213/1301* (2013.01)

(58) Field of Classification Search
USPC .......................................................... 398/45
See application file for complete search history.

(56) References Cited

U.S. PATENT DOCUMENTS

| | | |
|---|---|---|
| 2003/0210860 A1 | 11/2003 | Margalit |
| 2011/0229075 A1 | 9/2011 | Watanabe |
| 2012/0243827 A1 | 9/2012 | Jeong |
| 2013/0028557 A1 | 1/2013 | Lee et al. |
| 2013/0108276 A1 | 5/2013 | Kikuchi |
| 2016/0274438 A1* | 9/2016 | Shimizu .................. G02B 6/12 |

FOREIGN PATENT DOCUMENTS

| | | |
|---|---|---|
| CN | 102193144 A | 9/2011 |
| CN | 102692680 A | 9/2012 |
| CN | 102971976 A | 3/2013 |

OTHER PUBLICATIONS

Blumental et al., "Photonic Packet Switches: Architectures and Experimental Implementations," Proceedings of IEEE, vol. 82, No. 11, XP000491597, pp. 1650-1667, Institute of Electrical and Electronics Engineers (Nov. 1994).

Jinguji, "Planar Lightwave Circuits; Optical Devices for Processing Optical Signals as Light without transforming them into Electrical Signals," vol. 7, No. 1, XP000502966, pp. 80-86, NTT Review, Tokyo, Japan (Jan. 1995).

Inamoto et al., "Mach-Zehnder interferometric optical switch with MEMS phase shifter," XP19827776A, pp. 599-604, Springer (2009).

* cited by examiner

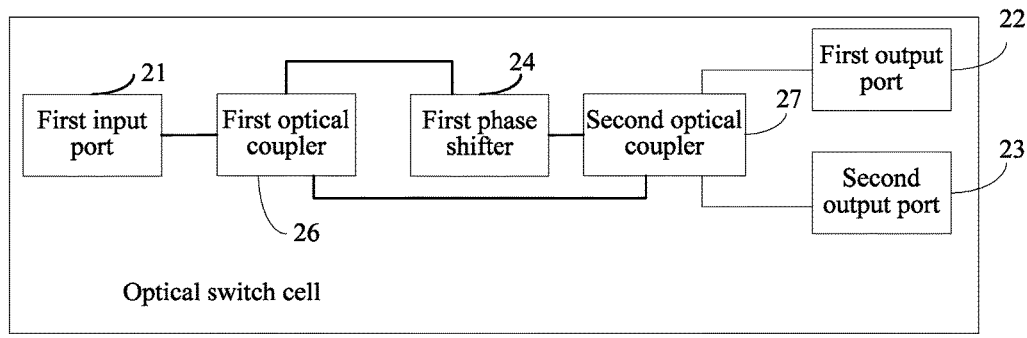

FIG. 1

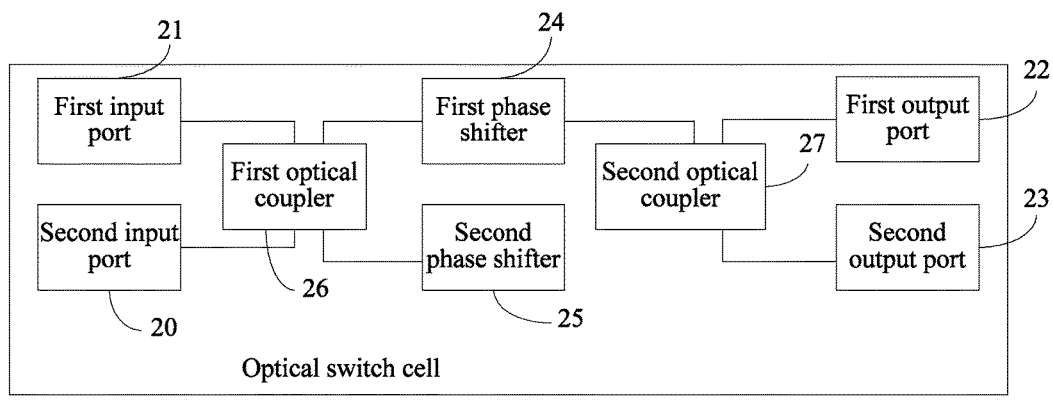

FIG. 2

Perform optical coupling processing on an input optical signal to split the optical signal into two paths of optical signals, and perform phase processing on the two paths of optical signals, so that a phase difference exists between the two paths of optical signals on which phase processing has been performed — 101

Perform optical coupling processing on the two paths of optical signals to output an optical signal from a first output port and/or a second output port according to the phase difference — 102

FIG. 3

OPTICAL SIGNAL CONTROL METHOD AND APPARATUS, AND OPTICAL SWITCH MATRIX CONTROL METHOD AND APPARATUS

CROSS-REFERENCE TO RELATED APPLICATIONS

This application is a continuation of International Application No. PCT/CN2013/090765, filed on Dec. 27, 2013, which is hereby incorporated by reference in its entirety.

TECHNICAL FIELD

Embodiments of the present invention relate to the field of optical fiber technologies, and in particular, to an optical signal control method and apparatus, and an optical switch matrix control method and apparatus.

BACKGROUND

An existing optical switch cell having both broadcast and switching functions includes a micro-electro-mechanical system (MEMS) optical switch cell. An operating principle of the optical switch cell is that: first, an optical signal passes through a mirror connected to an input end, so that a spectrum of the optical signal is expanded; then a drive controls the prism in the MEMS to be in an intermediate state, so that one part of the optical signal can be directly transmitted through the prism, and the other part of the optical signal is reflected by the prism to another optical path. In this way, the optical signal is split into two parts, where one part of the optical signal is transmitted to a channel 1, the other part of the optical signal is transmitted to a channel 2, and the optical signal passing through the channel 2 is then split into two parts after being processed by a next-level prim, and so on; and then broadcast of the optical signal can be implemented.

However, a position of the prism in the existing MEMS optical switch cell needs to be adjusted by means of mechanical control, which easily causes a jitter, leading to instability of signal performance, and an adjustment time for adjusting the position of the prism by means of mechanical control is relatively long. Therefore, a problem of a low reaction speed of an existing optical switch cell exists when the optical switch cell implements optical signal broadcast.

SUMMARY

The present invention provides an optical signal control method and apparatus, and an optical switch matrix control method and apparatus, which can resolve a problem of a low reaction speed of an existing optical switch cell that exists when the optical switch cell implements optical signal broadcast.

According to a first aspect, the present invention provides an optical switch cell, including:

a first input port, a first phase shifter, a first output port, a second output port, a first optical coupler, and a second optical coupler, where the first input port is connected to one end of the first optical coupler, the other end of the first optical coupler is connected to one end of the first phase shifter and connected to one end of the second optical coupler, the other end of the first phase shifter is connected to the one end of the second optical coupler, and the other end of the second optical coupler is connected to the first output port and the second output port;

the first optical coupler is configured to perform optical coupling processing on an optical signal input from the first input port, to split the optical signal into two paths of optical signals, where one path of optical signal is input to the first phase shifter, and the other path of optical signal is input to the second optical coupler;

the first phase shifter is configured to perform phase processing on the one path of optical signal, so that a phase difference exists between the one path of optical signal on which the first phase shifter has performed phase processing and the other path of optical signal that is input to the second optical coupler; and the second optical coupler is configured to perform optical coupling processing on the two paths of optical signals between which the phase difference exists, to output an optical signal from the first output port and/or the second output port.

According to the first aspect, in a first possible implementation manner, the optical switch cell further includes a second input port, where the second input port is connected to the one end of the first optical coupler; and the first optical coupler is configured to perform optical coupling processing on an optical signal input from the first input port and the second input port, to split the optical signal into two paths of optical signals.

According to the first aspect or the first possible implementation manner of the first aspect, in a second possible implementation manner, the optical switch cell further includes a second phase shifter, where the other end of the first optical coupler is connected to the one end of the first phase shifter and one end of the second phase shifter;

the first optical coupler is further configured to input one path of optical signal of the two paths of optical signals that are obtained by means of splitting after the optical coupling processing to the first phase shifter, and input the other path of optical signal to the second phase shifter; and the second phase shifter is configured to perform phase processing on the other path of optical signal, so that a phase difference exists between the one path of optical signal on which the first phase shifter has performed phase processing and the other path of optical signal on which the second phase shifter has performed phase processing.

According to the first aspect, or the first or the second possible implementation manner of the first aspect, in a third possible implementation manner, the phase difference includes a first phase difference, a second phase difference, or a third phase difference, where a range of the first phase difference is −5 degrees to 5 degrees, a range of the second phase difference is 175 degrees to 185 degrees, and a range of the third phase difference is 85 degrees to 95 degrees or is 265 degrees to 275 degrees.

According to the third possible implementation manner of the first aspect, in a fourth possible implementation manner, the phase difference is the third phase difference, and the second optical coupler is configured to perform optical coupling processing on the two paths of optical signals between which the phase difference exists, to output optical signals from the first output port and the second output port;

the phase difference is the second phase difference, and the second optical coupler is configured to perform optical coupling processing on the two paths of optical signals between which the phase difference exists, to output an optical signal from the first output port; or the third phase difference is the first phase difference, and the second optical coupler is configured to perform optical coupling processing on the two paths of optical signals between which the phase difference exists, to output an optical signal from the second output port.

According to a second aspect, an optical signal control method is provided, where the method includes:

performing optical coupling processing on an input optical signal to split the optical signal into two paths of optical signals, and performing phase processing on the two paths of optical signals, so that a phase difference exists between the two paths of optical signals; and performing optical coupling processing on the two paths of optical signals to output an optical signal from a first output port and/or a second output port according to the phase difference.

According to the second aspect, in a first possible implementation manner, the performing optical coupling processing on the two paths of optical signals to output an optical signal from the first output port and/or the second output port according to the phase difference includes:

if the phase difference is a first phase difference, performing optical coupling processing on the two paths of optical signals to output an optical signal from the second output port;

if the phase difference is a second phase difference, performing optical coupling processing on the two paths of optical signals to output an optical signal from the first output port; or if the phase difference is a third phase difference, performing optical coupling processing on the two paths of optical signals to output optical signals from the first output port and the second output port.

According to the second aspect or the first possible implementation manner of the second aspect, in a second possible implementation manner, a range of the first phase difference is −5 degrees to 5 degrees, a range of the second phase difference is 175 degrees to 185 degrees, and a range of the third phase difference is 85 degrees to 95 degrees or is 265 degrees to 275 degrees.

According to a third aspect, an optical switch matrix is provided, where the optical switch matrix includes:

N input ports arranged on an input side of the optical switch matrix, where N is an integer greater than 2;

N output ports arranged on an output side of the optical switch matrix; and multiple optical switch cells that interconnect any input port of the N input ports to any output port of the N output ports, where the optical signal received at one input port of the N input ports passes through one or more optical switch cells of the multiple optical switch cells, and reaches one output port of the N output ports; and the optical switch cells are the optical switch cell according to the first aspect or any possible implementation manner of the first aspect, and the multiple optical switch cells are connected to each other by using a transmission medium, where the transmission medium is used to transmit an optical signal.

According to a fourth aspect, an optical switch is provided, where the optical switch includes: a processor and the optical switch matrix according to the third aspect, where the processor is connected to the optical switch matrix by using an electric bus; and the processor is configured to determine, according to each input port and a corresponding output port that are preset in the optical switch matrix, output status information of optical switch cells between each input port and the corresponding output port in the optical switch matrix.

According to the fourth aspect, in a first possible implementation manner, the output status information of the optical switch cell includes a broadcast state, a straight-through state, or a crossover state, where in the broadcast state, an optical signal is input from an input port of the optical switch cell, and optical signals are output from a first output port and a second output port of the optical switch cell;

in the straight-through state, an optical signal is input from an input port of the optical switch cell, and an optical signal is output from a first output port of the optical switch cell; or in the crossover state, an optical signal is input from an input port of the optical switch cell, and an optical signal is output from a second output port of the optical switch cell.

According to the fourth aspect or the first possible implementation manner of the fourth aspect, in a second possible implementation manner, the optical switch further includes:

multiple power equalizers, where the multiple power equalizers each are connected to each output port in the optical switch matrix, where the processor is further configured to calculate, according to the determined output statuses of the optical switch cells between each input port and the corresponding output port, a power loss of the path of optical signal output from each output port, generate a power equalizer control signal by means of calculation according to a value of the power loss, and send the control signal to a power equalizer connected to the corresponding output port; and the power equalizer is configured to perform power compensation according to the power loss, sent by the processor, of the optical signal output from the output port connected to the power equalizer.

According to the fourth aspect or the first possible implementation manner of the fourth aspect, in a third possible implementation manner, the optical switch further includes:

multiple adjustable phase shifters, where the multiple adjustable phase shifters each are connected to each output port in the optical switch matrix;

the processor is further configured to calculate, according to the determined output statuses of the optical switch cells between each input port and the corresponding output port, a phase deviation of the path of optical signal output from each output port, and send, to an adjustable phase shifter connected to the corresponding output port, the phase deviation of the optical signal output from each output port; and the adjustable phase shifter is configured to perform phase compensation according to the phase deviation, sent by the processor, of the optical signal output from the output port connected to the adjustable phase shifter.

According to a fifth aspect, an optical switch is provided, where the optical switch includes: the optical switch matrix according to the third aspect, a receiver, a processor, and a transmitter, where the receiver is connected to each input port in the optical switch matrix by using an optical fiber, the processor is connected to the receiver and the transmitter by using an electric bus, and the transmitter is connected to the optical switch matrix by using the electric bus;

the receiver is configured to receive an optical signal from any input port in the optical switch matrix, where the optical signal includes a destination port identifier, and the destination port identifier is used to indicate an output port identifier;

the processor is configured to determine, according to the destination port identifier included in the optical signal that is received by the receiver, the output port identifier corresponding to the destination port identifier, and determine, according to the output port identifier, control information corresponding to the output port identifier, where the control information includes output status information of optical switch cells between the input port and an output port indicated by the output port identifier;

the transmitter is configured to send, to the optical switch matrix, the determined control information corresponding to the output port identifier; and the optical switch matrix is configured to enable, according to the control information corresponding to the output port identifier, the optical signal to pass through the optical switch cells between the input port and the output port indicated by the output port identifier, to output the optical signal from the output port indicated by the output port identifier.

According to the fifth aspect, in a first possible implementation manner, the processor is further configured to query a third list according to the determined output port identifier, to acquire current status information corresponding to the output port identifier, where the third list stores a correspondence between an identifier of each output port in the optical switch matrix and corresponding current status information; and the processor is further configured to: if the current status information corresponding to the output port identifier is an idle state, determine the control information corresponding to the output port identifier.

According to the fifth aspect or the first possible implementation manner of the fifth aspect, in a second possible implementation manner, the processor is specifically configured to:

if the destination port identifier is a broadcast identifier, determine, according to the broadcast identifier, that an output port identifier corresponding to the broadcast identifier is an identifier of each output port in the optical switch matrix; or if the destination port identifier is a unicast identifier, query a first list according to the unicast identifier, to determine an output port identifier corresponding to the unicast identifier, where the first list stores a correspondence between each output port identifier and a corresponding unicast identifier; or if the destination port identifier is a multicast identifier, query a second list according to the multicast identifier, to determine multiple output port identifiers corresponding to the multicast identifier, where the second list stores a correspondence between each multicast identifier and corresponding multiple output port identifiers.

According to the fifth aspect or the first possible implementation manner of the fifth aspect, in a third possible implementation manner, the processor is further configured to: after determining the control information corresponding to the output port identifier, set the current status information, in the third list, of the output port corresponding to the output port identifier to an occupied state.

According to the fifth aspect or the first possible implementation manner of the fifth aspect, in a fourth possible implementation manner, the processor is further configured to: after the optical switch matrix outputs, according to the determined control information corresponding to the output port identifier, the optical signal from the output port indicated by the output port identifier, set the current status information, in the third list, of the output port corresponding to the output port identifier to the idle state.

According to a sixth aspect, an optical switch matrix control method is provided, where the method includes:

determining, according to each input port and a corresponding output port that are preset in an optical switch matrix, output statuses of optical switch cells between each input port and the corresponding output port in the optical switch matrix;

calculating, according to the determined output status information of the optical switch cells between each input port and the corresponding output port, a power loss of an optical signal output from each output port; and performing power compensation according to the calculated power loss of the optical signal output from each output port.

According to the sixth aspect, in a first possible implementation manner, after the determining output statuses of optical switch cells between each input port and the corresponding output port in the optical switch matrix, the method further includes:

calculating, according to the determined output status information of the optical switch cells between each input port and the corresponding output port, a phase deviation of the optical signal output from each output port; and performing phase compensation according to the calculated phase deviation of the optical signal output from each output port.

According to the sixth aspect or the first possible implementation manner of the sixth aspect, in a second possible implementation manner, the output status information of the optical switch cell includes a broadcast state, a straight-through state, or a crossover state, where in the broadcast state, an optical signal is input from an input port of the optical switch cell, and optical signals are output from a first output port and a second output port of the optical switch cell;

in the straight-through state, an optical signal is input from an input port of the optical switch cell, and an optical signal is output from a first output port of the optical switch cell; or in the crossover state, an optical signal is input from an input port of the optical switch cell, and an optical signal is output from a second output port of the optical switch cell.

According to a seventh aspect, an optical signal control method is provided, where the method includes:

receiving an optical signal input from any input port in an optical switch matrix, where the optical signal includes a destination port identifier, and the destination port identifier is used to indicate an output port identifier;

determining, according to the destination port identifier, the output port identifier corresponding to the destination port identifier;

determining, according to the output port identifier, control information corresponding to the output port identifier, where the control information includes output status information of optical switch cells between the input port and an output port indicated by the output port identifier; and sending, to the optical switch matrix, the determined control information corresponding to the output port identifier, so that the optical switch matrix enables, according to the control information corresponding to the output port identifier, the optical signal to pass through the optical switch cells between the input port and the output port indicated by the output port identifier, to output the optical signal from the output port indicated by the output port identifier.

According to the seventh aspect, in a first possible implementation manner, the determining, according to the output port identifier, control information corresponding to the output port identifier includes:

querying a third list according to the output port identifier, to acquire current status information corresponding to the output port identifier, where the third list stores a correspondence between an identifier of each output port in the optical switch matrix and corresponding current status information; and if the current status information corresponding to the output port identifier is an idle state, determining the control information corresponding to the output port identifier.

According to the seventh aspect, in a second possible implementation manner, the determining, according to the destination port identifier, the output port identifier corresponding to the destination port identifier includes:

if the destination port identifier is a broadcast identifier, determining, according to the broadcast identifier, that an output port identifier corresponding to the broadcast identifier is an identifier of each output port in the optical switch matrix; or if the destination port identifier is a unicast identifier, querying a first list according to the unicast identifier, to determine an output port identifier corresponding to the unicast identifier, where the first list stores a correspondence between each output port identifier and a corresponding unicast identifier; or if the destination port identifier is a multicast identifier, querying a second list according to the multicast identifier, to determine multiple output port identifiers corresponding to the multicast identifier, where the second list stores a correspondence between each multicast identifier and corresponding multiple output port identifiers.

According to the first or the second possible implementation manner of the seventh aspect, in a third possible implementation manner, after the determining the control information corresponding to the output port identifier, the method includes:

setting the current status information, in the third list, of the output port corresponding to the output port identifier to an occupied state.

According to the first or the second possible implementation manner of the seventh aspect, in a fourth possible implementation manner, after the optical signal is output, according to the determined control information corresponding to the output port identifier, from the output port indicated by the output port identifier, the method includes:

setting the current status information, in the third list, of the output port corresponding to the output port identifier to the idle state.

According to an eighth aspect, an optical switch cell is provided, where the optical switch cell includes:

a first optical coupling processing module, configured to perform optical coupling processing on an input optical signal, to split the input optical signal into two paths of optical signals;

a phase processing module, configured to perform phase processing on the two paths of optical signals obtained by means of splitting by the first optical coupling processing module, so that a phase difference exists between the two paths of optical signals; and a second optical coupling processing module, configured to perform optical coupling processing on the two paths of optical signals that have been processed by the phase processing module and between which the phase difference exists, to output an optical signal from the first output port and/or the second output port.

According to the eighth aspect, in a first possible implementation manner, the second optical coupling processing module is specifically configured to:

if the phase difference is a first phase difference, perform optical coupling processing on the two paths of optical signals to output an optical signal from the second output port;

if the phase difference is a second phase difference, perform optical coupling processing on the two paths of optical signals to output an optical signal from the first output port; or if the phase difference is a third phase difference, perform optical coupling processing on the two paths of optical signals to output optical signals from the first output port and the second output port.

According to the eighth aspect or the first possible implementation manner of the eighth aspect, in a second possible implementation manner, a range of the first phase difference is −5 degrees to 5 degrees, a range of the second phase difference is 175 degrees to 185 degrees, and a range of the third phase difference is 85 degrees to 95 degrees or is 265 degrees to 275 degrees.

In the present invention, optical coupling processing is performed on an input optical signal to split the optical signal into two paths of optical signals, phase processing is performed on the two paths of optical signals, so that a phase difference exists between the two paths of optical signals on which phase processing has been performed; and optical coupling processing is performed on the two paths of optical signals between which the phase difference exists, to output an optical signal from a first output port and/or a second output port. A time for performing phase processing is short, and a jitter is not easily caused, and therefore an output signal is stable, and a reaction speed is high, which can resolve a problem of a low reaction speed of an existing optical switch cell that exists when the optical switch cell implements optical signal broadcast.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

FIG. 1 is a schematic structural diagram of an optical switch cell according to an embodiment of the present invention;

FIG. 2 is a schematic structural diagram of an optical switch cell according to another embodiment of the present invention;

FIG. 3 is a schematic flowchart of an optical signal control method according to an embodiment of the present invention;

DESCRIPTION OF EMBODIMENTS

Figure 4:
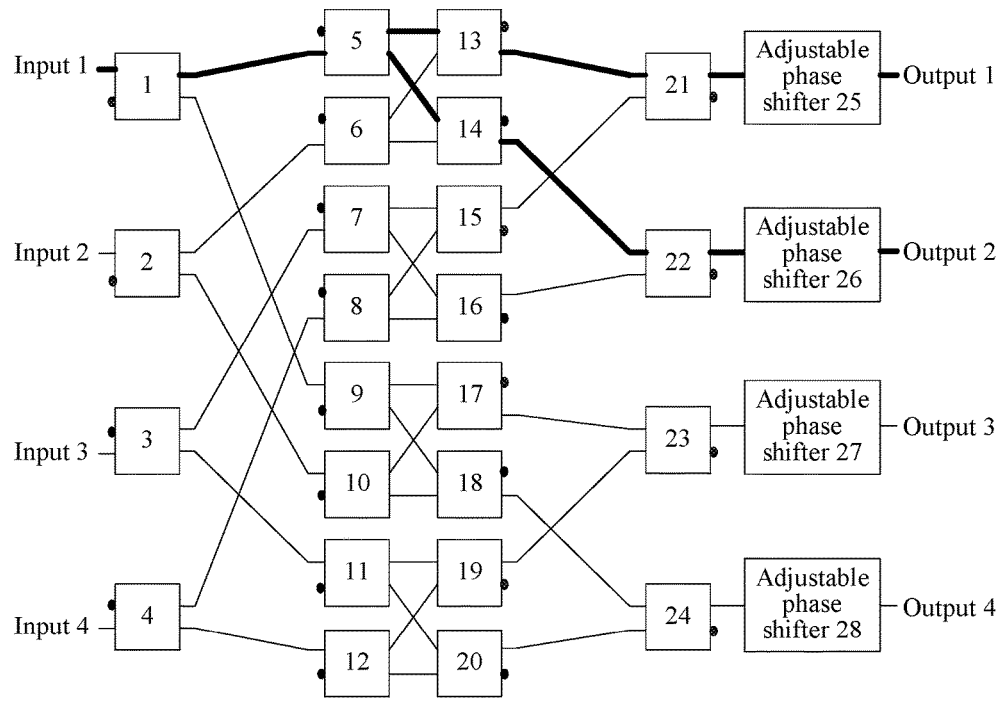
FIG. 4 is an architectural diagram of an optical switch matrix according to an embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

FIG. 1 is a schematic structural diagram of an optical switch cell according to an embodiment of the present invention. As shown in FIG. 1, the optical switch cell in this embodiment of the present invention includes at least one input port (such as a first input port 21 shown in FIG. 1), one phase shifter (such as a first phase shifter 24 shown in FIG. 1), a first output port 22, a second output port 23, a first optical coupler 26, and a second optical coupler 27, where the first input port 21 is connected to one end of the first optical coupler 26, the other end of the first optical coupler 26 is connected to one end of the first phase shifter 24 and one end of the second optical coupler 27, the other end of the first phase shifter 24 is connected to the one end of the second optical coupler 27, and the other end of the second optical coupler 27 is connected to the first output port 22 and the second output port 23;

the first optical coupler 26 is configured to perform optical coupling processing on an optical signal input from the first input port, to split the optical signal into two paths of optical signals, where one path of optical signal is input to the first phase shifter 24, and the other path of optical signal is input to the second optical coupler 27; and the first phase shifter 24 is configured to perform phase processing on the one path of optical signal that is output from the first optical coupler 26 after the optical coupling processing, so that a phase difference exists between the one path of optical signal on which the first phase shifter 24 has performed phase processing and the other path of optical signal that is directly output from the first optical coupler 26 to the second optical coupler 27; for example, a phase of one arm of the first phase shifter 24 is kept unchanged, and a phase of the other arm of the first phase shifter 24 is changed, so that a phase of the one path of optical signal input to the first phase shifter 24 can be changed.

For example, the phase difference includes 0 degrees, 90 degrees, 180 degrees, or 270 degrees.

For example, when the phase difference is 90 degrees or 270 degrees, the second optical coupler 27 is configured to perform optical coupling processing on the one path of optical signal output from the first phase shifter 24 and the other path of optical information output from the first optical coupler 26, to output optical signals from the first output port 22 and the second output port 23. In this case, the optical switch cell can implement broadcast output of an optical signal, and in this case, an output status of the optical switch cell is a broadcast state, that is, an optical signal is input from the first input port of the optical switch cell, and optical signals are output from the first output port and the second output port of the optical switch cell.

It should be noted that, in an actual application, the phase difference may include a value approximate to 90 degrees or a value approximate to 270 degrees, for example, a value between 85 degrees and 95 degrees or a value between 265 degrees and 275 degrees, and broadcast output of an optical signal can also be implemented.

It should be noted that, the second optical coupler performs interference on two paths of optical information between which a phase difference exists; after interference has been performed on optical signals having a different phase difference, a power distribution ratio of two output ports for the optical signals is caused to be different; when the phase difference is a value between 85 degrees and 95 degrees or a value between 265 degrees and 275 degrees, a power distribution ratio of the two output ports is 1:1, and in this case, broadcast output can be implemented.

When the phase difference is 180 degrees, the second optical coupler 27 is further configured to perform optical coupling processing on the one path of optical signal output from the first phase shifter 24 and the other path of optical information output from the first optical coupler 26, to output an optical signal from the first output port 22. In this case, the optical switch cell can implement straight-through output of an optical signal, and an output status of the optical switch cell is a straight-through state, that is, an optical signal is input from the first input port of the optical switch cell, and an optical signal is output from the first output port of the optical switch cell. It should be noted that, in an actual application, the phase difference may include a value approximate to 180 degrees, and when the phase difference is a value between 175 degrees and 185 degrees, the second optical coupler performs interference on two paths of optical information between which a phase difference exists, so that a power distribution ratio of two output ports for an optical signal is caused to be 1:0, and in this case, straight-through output of an optical signal can be implemented.

When the phase difference is 0 degrees, the second optical coupler 27 is further configured to perform optical coupling processing on the two paths of optical signals on which phase processing has been performed, to output an optical signal from the second output port 23. In this case, the optical switch cell can implement crossover output of an optical signal, and an output status of the optical switch cell is a crossover state, that is, an optical signal is input from the first input port of the optical switch cell, and an optical signal is output from the second output port of the optical switch cell.

It should be noted that, in an actual application, the phase difference may include a value approximate to 0 degrees, and when the phase difference is a value between −5 degrees and 5 degrees, the second optical coupler performs interference on two paths of optical information between which a phase difference exists, so that a power distribution ratio of two output ports for an optical signal is caused to be 0:1, and in this case, crossover output of an optical signal can be implemented.

Based on the optical switch cell in the embodiment shown in FIG. 1, FIG. 2 is a schematic structural diagram of an optical switch cell according to another embodiment of the present invention. As shown in FIG. 2, the optical switch cell shown in this embodiment further includes another input port (a second input port 20 shown in FIG. 2) and another phase shifter (a second phase shifter 25 shown in FIG. 2). The second input port 20 is connected to the one end of the first optical coupler 26, and the other end of the first optical coupler 26 is connected to the first phase shifter 24 and the second phase shifter 25.

The first optical coupler 26 is configured to perform optical coupling processing on an optical signal input from the first input port 21 and the second input port 20, to split the optical signal into two paths of optical signals.

The first phase shifter 24 and the second phase shifter 25 are separately configured to perform phase processing on the two paths of optical signals that are output from the first optical coupler 26 after the optical coupling processing, so that a phase difference exists between the two paths of optical signals on which the first phase shifter and the second phase shifter has separately performed phase processing.

For example, the phase difference includes 0 degrees, 90 degrees, 180 degrees, or 270 degrees.

For example, when the phase difference is 90 degrees or 270 degrees, the second optical coupler 27 is further configured to perform optical coupling processing on the two paths of optical signals on which phase processing has been performed, to output optical signals from the first output port 22 and the second output port 23. In this case, the optical switch cell can implement broadcast output of an optical signal.

When the phase difference is 180 degrees, the second optical coupler 27 is further configured to perform optical coupling processing on the two paths of optical signals on which phase processing has been performed, to output an optical signal from the second output port 23. The optical switch cell can implement straight-through output of an optical signal.

When the phase difference is 0 degrees, the second optical coupler 27 is further configured to perform optical coupling processing on the two paths of optical signals on which phase processing has been performed, to output an optical signal from the first output port 22. The optical switch cell can implement crossover output of an optical signal.

It should be noted that, operating principles of the first and the second phase shifters and the first and the second optical couplers are shown in FIG. 1, and details are not described again. For example, a range of the phase difference is −5 degrees to 5 degrees, or 85 degrees to 95 degrees, or 175 degrees to 185 degrees, or 265 degrees to 275 degrees.

In this embodiment of the present invention, optical coupling processing is performed on an input optical signal to split the optical signal into two paths of optical signals, and phase processing is performed on the two paths of optical signals, so that a phase difference exists between the two paths of optical signals on which the first phase shifter and the second phase shifter have separately performed phase processing, and crossover output, straight-through output, or broadcast output of an optical signal is implemented according to a different phase difference. In this embodiment, by performing only voltage control on a phase shifter that performs phase processing, an input optical signal can be split into two paths of optical signals with a different phase difference. A time of the voltage control is short, and a jitter is not easily caused, and therefore an output signal is stable, and a reaction speed is high, which can resolve a problem of a low reaction speed of an existing optical switch cell that exists when the optical switch cell implements optical signal broadcast.

FIG. 3 is a schematic flowchart of an optical signal control method according to an embodiment of the present invention. As shown in FIG. 3, the optical signal control method in this embodiment may be specifically implemented by using the optical switch cell shown in FIG. 1 or FIG. 2, and includes:

101: Perform optical coupling processing on an input optical signal to split the optical signal into two paths of optical signals, and perform phase processing on the two paths of optical signals, so that a phase difference exists between the two paths of optical signals on which phase processing has been performed.

For the optical switch cell shown in FIG. 1 or FIG. 2, specific descriptions are provided by using an optical signal input from the first input port of the optical switch cell as an example. The first optical coupler in the optical switch cell performs optical coupling on the optical signal input from the first input port, to split the optical signal into two paths of optical signals; and then, at least one phase shifter in the optical switch cell performs phase processing on the two paths of optical signals, so that a phase difference exists between the two paths of optical signals on which phase processing has been performed. For a description about the phase difference, reference may be made to the detailed description in the embodiment shown in FIG. 1 or FIG. 2, and details are not described again.

For example, different voltages may be loaded to a phase shifter, to control the phase shifter to change a phase of an output optical signal. As shown in FIG. 1 or FIG. 2, when a voltage loaded to the first phase shifter is $V_{A1}$, and a voltage loaded to the second phase shifter is $V_{B1}$, the phase difference between the two paths of optical signals on which phase processing has been performed is 90 degrees or 270 degrees; when a voltage loaded to the first phase shifter is $V_{A2}$, and a voltage loaded to the second phase shifter is $V_{B2}$, the phase difference between the two paths of optical signals on which phase processing has been performed is 180 degrees; or when a voltage loaded to the first phase shifter is $V_{A3}$, and a voltage loaded to the second phase shifter is $V_{B3}$, the phase difference between the two paths of optical signals on which phase processing has been performed is 0 degrees.

102: Perform optical coupling processing on the two paths of optical signals to output an optical signal from a first output port and/or a second output port according to the phase difference.

Specifically, if the phase difference is 90 degrees or 270 degrees, the second optical coupler performs optical coupling processing on the two paths of optical signals to output optical signals from the first output port and the second output port, which implements broadcast output of the optical switch cell;

if the phase difference is 180 degrees, the second optical coupler performs optical coupling processing on the two paths of optical signals to output an optical signal from the first output port, which implements straight-through output of the optical switch cell; or if the phase difference is 0 degrees, the second optical coupler performs optical coupling processing on the two paths of optical signals to output an optical signal from the second output port, which implements crossover output of the optical switch cell.

In this embodiment of the present invention, optical coupling processing is performed on an optical signal input from an input port to split the optical signal into two paths of optical signals, and phase processing is performed on the two paths of optical signals, so that a phase difference exists between the two paths of optical signals on which phase processing has been performed; and then optical coupling processing is performed on the two paths of optical signals to output an optical signal from a first output port and/or a second output port according to the phase difference, which can implement crossover output, straight-through output, or broadcast output of an optical signal. In this embodiment, by performing only voltage control on a phase shifter that performs phase processing, an input optical signal can be split into two paths of optical signals with a different phase difference. A time of the voltage control is short, and a jitter is not easily caused, and therefore an output signal is stable, and a reaction speed is high, which can resolve a problem of a low reaction speed of an existing optical switch cell that exists when the optical switch cell implements optical signal broadcast.

An embodiment of the present invention further provides an optical switch matrix, including:

N input ports arranged on an input side of the optical switch matrix, where N is an integer greater than 2; N output ports arranged on an output side of the optical switch matrix; and multiple optical switch cells that interconnect any input port of the N input ports to any output port of the N output ports, where the optical signal received at one input port of the N input ports passes through one or more optical switch cells of the multiple optical switch cells, and reaches one output port of the N output ports; and the optical switch cells are the optical switch cell provided in the embodiment shown in FIG. 1 or FIG. 2, and the multiple optical switch cells are connected to each other by using a transmission medium, where the transmission medium is a medium for transmitting an optical signal, including a medium such as an optical fiber or a waveguide.

FIG. 4 is an architectural diagram of an optical switch matrix according to an embodiment of the present invention. The optical switch matrix includes multiple optical switch cells, where the optical switch cells applied in this embodiment are the optical switch cell provided in the embodiment shown in FIG. 1 or FIG. 2. Descriptions are provided by using a 4×4 optical switching broadcast architecture as an example, and this architecture may be expanded to any n×n optical switching broadcast architecture. As shown in FIG. 4, the optical switch matrix includes 24 optical switch cells, where each input port and a corresponding output port are preset in the optical switch matrix, and a connection relationship and an output status of each optical switch cell are set according to the input port and the corresponding output port that are preset. For example, the first to the fourth optical switch cells are respectively connected to the first to the fourth input ports, and the 21$^{th}$ to the 24$^{th}$ optical switch cells are respectively connected to the first to the fourth output ports. Connection relationships of other optical switch cells are shown in FIG. 4. An optical switch cell 1 is connected to an optical switch cell 5 and an optical switch cell 9; the optical switch cell 5 is connected to an optical switch cell 13 and an optical switch cell 14; the optical switch cell 13 is connected to an optical switch cell 21; the optical switch cell 14 is connected to an optical switch cell 22; the optical switch cell 9 is connected to an optical switch cell 17 and an optical switch cell 18; the optical switch cell 17 is connected to an optical switch cell 23; and the optical switch cell 18 is connected to an optical switch cell 24.

An optical switch cell 2 is connected to an optical switch cell 6 and an optical switch cell 10; the optical switch cell 6 is connected to the optical switch cell 13 and the optical switch cell 14; the optical switch cell 13 is connected to the optical switch cell 21, and the optical switch cell 14 is connected to the optical switch cell 22; the optical switch cell 10 is connected to the optical switch cell 17 and the optical switch cell 18; the optical switch cell 17 is connected to the optical switch cell 23; and the optical switch cell 18 is connected to the optical switch cell 24.

An optical switch cell 3 is connected to an optical switch cell 7 and an optical switch cell 11; the optical switch cell 7 is connected to an optical switch cell 15 and an optical switch cell 16; the optical switch cell 16 is connected to the optical switch cell 22; the optical switch cell 15 is connected to the optical switch cell 21; the optical switch cell 11 is connected to an optical switch cell 19 and an optical switch cell 20; the optical switch cell 19 is connected to the optical switch cell 23; and the optical switch cell 20 is connected to the optical switch cell 24.

An optical switch cell 4 is connected to an optical switch cell 8 and an optical switch cell 12; the optical switch cell 8 is connected to the optical switch cell 15 and the optical switch cell 16; the optical switch cell 15 is connected to the optical switch cell 21; the optical switch cell 16 is connected to the optical switch cell 22; the optical switch cell 12 is connected to the optical switch cell 19 and the optical switch cell 20; the optical switch cell 19 is connected to the optical switch cell 23; and the optical switch cell 20 is connected to the optical switch cell 24.

As shown in FIG. 4, assuming that an optical signal input from the first input port is multicast to the first and the second output ports, descriptions are provided by using an example in which an optical signal is input from the first input port and an optical signal is output from the second output port. A total of four optical switch cells need to be passed through, that is, the optical switch cells 1, 5, 13, and 21, where an output status of the optical switch cell 1 is straight-through output (bar), an output status of the optical switch cell 5 is broadcast output (split), an output status of the optical switch cell 13 is crossover output (cross), and an output status of the optical switch cell 21 is straight-through output (bar).

As shown in FIG. 4, after the output statuses of the optical switch cells 1, 5, 13, and 21 are determined, the output status of the optical switch cell 1 is straight-through output (bar), that is, after the optical switch cell 1 is passed through, a phase difference between an output optical signal and an input optical signal is 180 degrees; after the optical switch cell 5 is passed through, phase differences between optical signals output from the optical switch cell 5 and an optical signal input from the optical switch cell 5 are both 135 degrees; after the optical switch cell 13 is passed through, a phase difference between an optical signal output from the optical switch cell 13 and an optical signal input from the optical switch cell 13 is 90 degrees; after the optical switch cell 21 is passed through, a phase difference between an optical signal output from the optical switch cell 21 and an optical signal input from the optical switch cell 21 is 180 degrees; therefore, an accumulated phase change between an optical signal finally output from the first output port and an optical signal input from the first input port is 180+135+ 90+180=360+225 (degrees).

To make a phase of the optical signal output from the first output port the same as a phase of the optical signal input from the first input port, as shown in FIG. 4, a phase shifter such as an adjustable phase shifter 25 may be used to perform phase compensation on the optical signal that is finally output from the first output port.

For example, in this embodiment, it is assumed that an input port and an output port for an optical signal in the optical switch matrix are preset; according to each input port and a corresponding output port that are preset, output statuses of optical switch cells between each input port and the corresponding output port in the optical switch matrix may be determined, and the determined output statuses of the optical switch cells between each input port and the corresponding output port may be stored into an optical switch control status table. In a case in which an architecture of the optical switch matrix is not changed, the output statuses of the optical switch cells between each input port and the corresponding output port can be quickly acquired by querying the optical switch control status table.

In this embodiment of the present invention, according to each input port and a corresponding output port that are preset, output statuses of optical switch cells between each input port and the corresponding output port in the optical switch matrix are determined; a phase deviation of the path of optical signal output from each output port is calculated according to the determined output statuses of the optical switch cells between each input port and the corresponding output port. For example, offline processing may be performed in advance according to the output statuses of the optical switch cells, to obtain by means of calculation a phase deviation of an optical signal output from each output port, and the phase deviation may be stored into a phase deviation list corresponding to the output port; and then, a phase deviation of a destination output port can be obtained by directly searching the phase deviation list according to the destination output port, and phase compensation is performed according to the calculated phase deviation of the path of optical signal output from each output port. In this way, a phase of the optical signal output from each output port is the same as a phase of an optical signal input from an input port corresponding to the output port, and the optical signal output from each output port can work in a coherent system.

Figure 5:
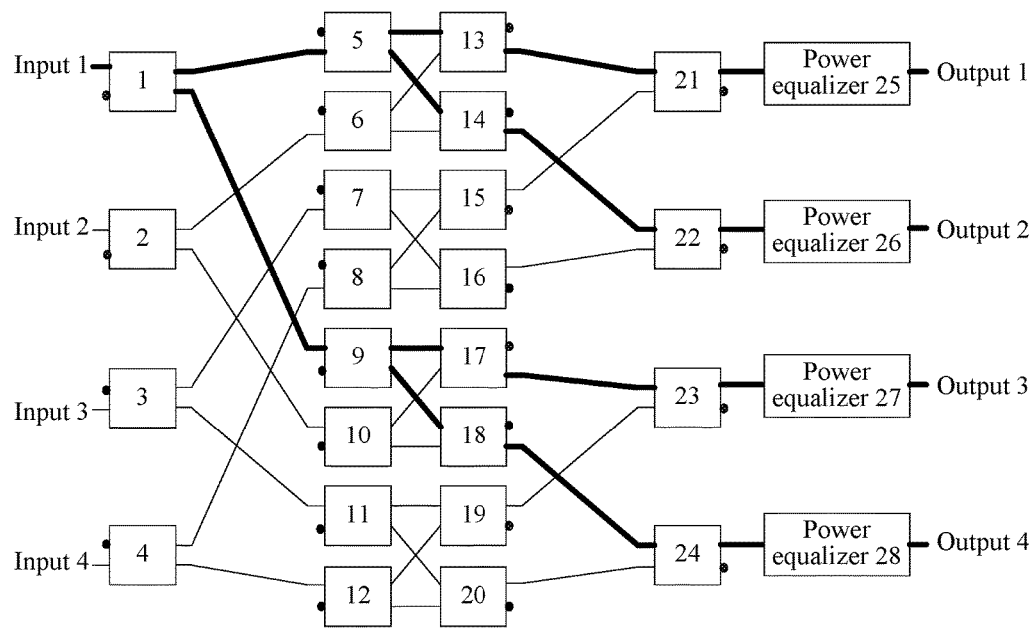
FIG. 5 is an architectural diagram of an optical switch matrix according to another embodiment of the present invention.

FIG. 5 is an architectural diagram of an optical switch matrix according to another embodiment of the present invention. The optical switch matrix includes multiple optical switch cells, where the optical switch cells applied in this embodiment are the optical switch cell provided in the embodiment shown in FIG. 1 or FIG. 2. As shown in FIG. 5, each input port and a corresponding output port are preset in the optical switch matrix, and a connection relationship and an output status of each optical switch cell are set according to the input port and the corresponding output port that are preset. For example, when an optical signal input from a first input port needs to be broadcast to four output ports (1, 2, 3, and 4), at least 11 optical switch cells, that is, 1, 5, 9, 13, 14, 17, 18, 21, 22, 23, and 24, are controlled, where output statuses of the optical switch cells 1, 5, and 9 are a broadcast state, and output statuses of the other eight optical switch cells are a crossover state or a straight-through state.

In the broadcast state, an optical signal input from an input port is output from two output ports, so that a power of an optical signal output from each output port reduces by half relative to a power of the input optical signal. In an actual application, in the crossover state or the straight-through state, an optical switch cell also has an insertion loss, and therefore power equalization processing must be performed at an output end. For example, a power loss of the optical signal output from each output port may be calculated according to the determined output statuses of the optical switch cells between each input port and the corresponding output port, and power compensation may be performed according to the calculated power loss of the optical signal output from each output port.

The output statuses of the optical switch cells between each input port and the corresponding output port are different, and therefore a problem that powers of optical signals output from different output ports are unequal exists. As shown in FIG. 5, a power equalizer may be added before each output port to resolve a problem of an unequal output power.

Figure 6:
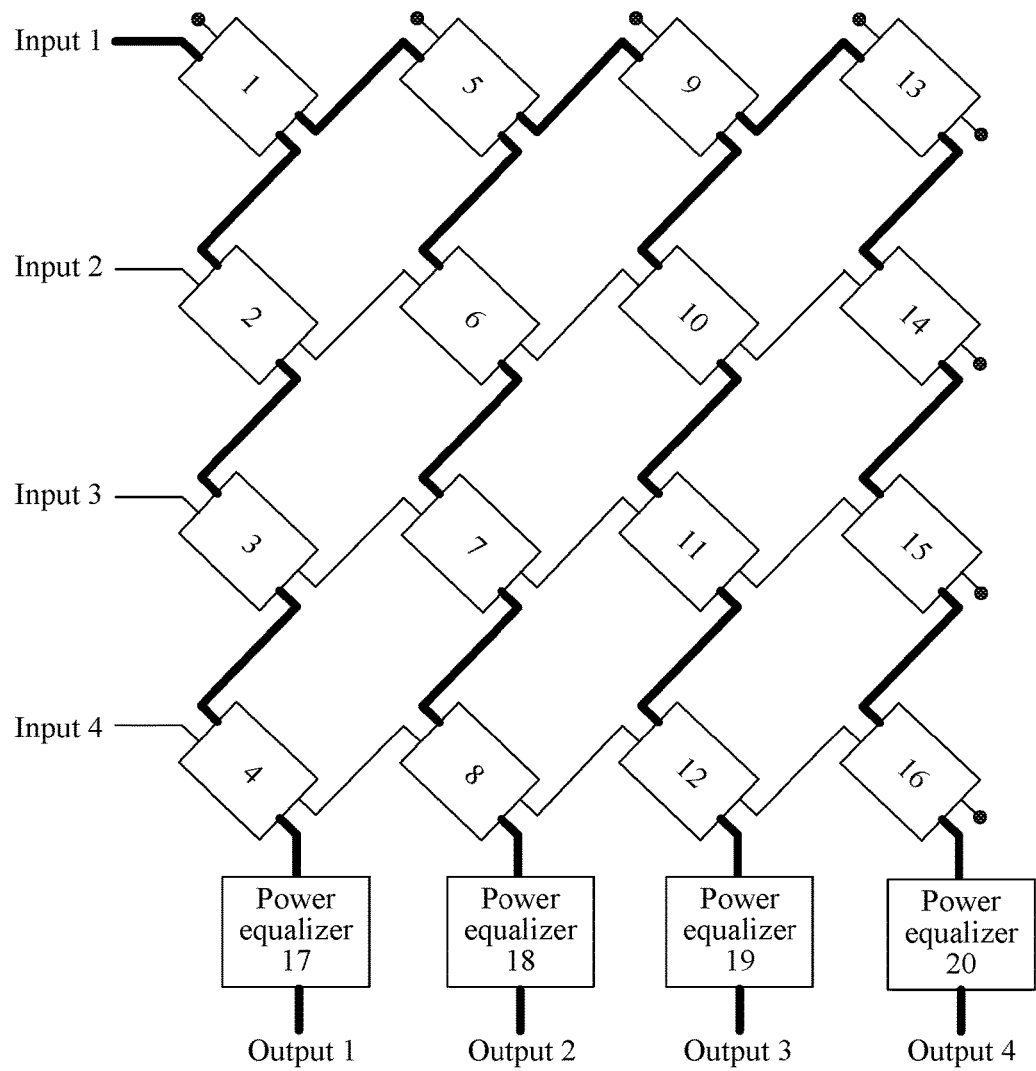
FIG. 6 is an architectural diagram of an optical switch matrix according to another embodiment of the present invention.

FIG. 6 is an architectural diagram of an optical switch matrix according to another embodiment of the present invention. The architectural diagram of the optical switch matrix shown in FIG. 6 is an architectural diagram of an irregular optical switch matrix. Quantities of optical switch cells passed through from an input port to other output ports are not the same, and the optical switch cells are specifically the optical switch cell provided in the embodiment shown in FIG. 1 or FIG. 2. As shown in FIG. 6, each input port and a corresponding output port are preset in the optical switch matrix, and a connection relationship and an output status of each optical switch cell are set according to the input port and the corresponding output port that are preset. For example, in the optical switch matrix in this embodiment, a minimum quantity of optical switch cells between each input port and a final output port is 1 (for example, from an input port 4 to an output port 1, there is only one optical switch cell), and a maximum quantity is 15. Therefore, in this case, powers of optical signals output from different output ports must be equalized, which may be specifically implemented by adding a power equalizer before an output port.

As shown in FIG. 6, descriptions are provided by using an example in which an optical signal input from a first input port is broadcast to output ports (1, 2, 3, and 4). In this case, specific output statuses of all 16 optical switch cells are required, where optical switch cells 1, 5, and 9 are in a broadcast state, an optical switch cell 13 is in a straight-through state, and the other optical switch cells are in a crossover state.

It can be learned, by analyzing the four output ports for broadcasting, that:

a total of four optical switch cells are passed through from the first input port to a first output port, where one optical switch cell is in the broadcast state, and three optical switch cells are in the crossover state;

a total of five optical switch cells are passed through from the first input port to a second output port, where two optical switch cells are in the broadcast state, and three optical switch cells are in the crossover state;

a total of six optical switch cells are passed through from the first input port to a third output port, where three optical switch cells are in the broadcast state, and three optical switch cells are in the crossover state; and a total of seven optical switch cells are passed through from the first input port to a fourth output port, where three optical switch cells are in the broadcast state, one optical switch cell is in the straight-through state, and three optical switch cells are in the crossover state.

Assuming that the straight-through state is not considered and a power loss of an optical switch cell in the straight-through state is not considered, a power of an optical signal from the second output port reduces by half relative to a power of an optical signal from the first output port. As shown in FIG. 6, powers of optical signals of output ports 1, 2, and 3 may be respectively attenuated by eight times, four times, and two times, or powers of optical signals of output ports 2, 3, and 4 may be respectively amplified by two times, four times, and eight times; and then, fine adjustment may be further performed, so that the powers of the optical signals of the four output ports are consistent.

In this embodiment of the present invention, according to each input port and a corresponding output port that are preset, output statuses of optical switch cells between each input port and the corresponding output port in the optical switch matrix are determined; a power loss of the path of optical signal output from each output port is calculated according to the determined output statuses of the optical switch cells between each input port and the corresponding output port; and power compensation is performed according to the calculated power loss of the path of optical signal output from each output port, so that powers of optical signals output from output ports are the same.

Figure 7:
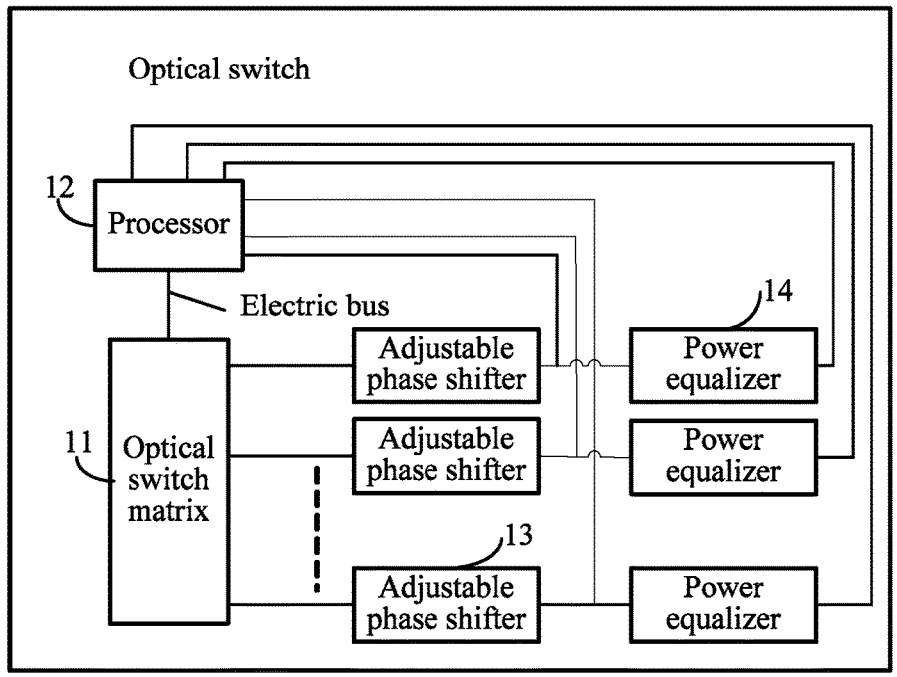
FIG. 7 is a schematic structural diagram of an optical switch according to an embodiment of the present invention.

Based on the optical switch matrix shown in FIG. 4, FIG. 5, or FIG. 6, FIG. 7 is a schematic structural diagram of an optical switch according to an embodiment of the present invention. As shown in FIG. 7, the optical switch includes an optical switch matrix 11; the optical switch matrix 11 includes multiple optical switch cells, where the optical switch cells are the optical switch cell provided in the embodiment shown in FIG. 1 or FIG. 2; and further, the optical switch further includes a processor 12 and multiple adjustable phase shifters 13, where the processor 12 is connected to the optical switch matrix 11 and the multiple adjustable phase shifters 13 by using an electric bus, and the multiple adjustable phase shifters 13 each are connected to each output port in the optical switch matrix;

the processor 12 is configured to determine, according to each input port and a corresponding output port that are preset in the optical switch matrix 11, output statuses of optical switch cells between each input port and the corresponding output port in the optical switch matrix;

the processor 12 is further configured to calculate, according to the determined output statuses of the optical switch cells between each input port and the corresponding output port, a phase deviation of an optical signal output from each output port, and send, to an adjustable phase shifter connected to the corresponding output port, the phase deviation of the optical signal output from each output port; and the adjustable phase shifter 13 is configured to perform phase compensation according to the phase deviation, sent by the processor, of the optical signal output from the output port connected to the adjustable phase shifter.

The output status of the optical switch cell includes a broadcast state, a straight-through state, or a crossover state.

As shown in FIG. 1, in the broadcast state, an optical signal is input from the first input port of the optical switch cell, and optical signals are output from the first output port and the second output port of the optical switch cell;

in the straight-through state, an optical signal is input from the first input port of the optical switch cell, and an optical signal is output from the first output port of the optical switch cell; or in the crossover state, an optical signal is input from the first input port of the optical switch cell, and an optical signal is output from the second output port of the optical switch cell.

As shown in FIG. 2, in the broadcast state, it may also be that, an optical signal is input from the second input port of the optical switch cell, and optical signals are output from the first output port and the second output port of the optical switch cell;

in the straight-through state, it may also be that, an optical signal is input from the second input port of the optical switch cell, and an optical signal is output from the second output port of the optical switch cell; or in the crossover state, it may also be that, an optical signal is input from the second input port of the optical switch cell, and an optical signal is output from the first output port of the optical switch cell.

For example, the optical switch further includes: multiple power equalizers 14, where the multiple power equalizers each are connected to each output port in the optical switch matrix;

the processor 12 is further configured to calculate, according to the determined output statuses of the optical switch cells between each input port and the corresponding output port, a power loss of an optical signal output from each output port, and send, to a power equalizer connected to the corresponding output port, the power loss of the optical signal output from each output port; and the power equalizer 14 is configured to perform power compensation according to the power loss, sent by the processor, of the optical signal output from the output port connected to the power equalizer.

In this embodiment of the present invention, according to each input port and a corresponding output port that are preset, output statuses of optical switch cells between each input port and the corresponding output port in the optical switch matrix are determined; a phase deviation of an optical signal output from each output port is calculated according to the determined output statuses of the optical switch cells between each input port and the corresponding output port; and phase compensation is performed according to the calculated phase deviation of the optical signal output from each output port, so that a phase of the optical signal output from each output port is the same as a phase of an optical signal input from an input port corresponding to the output port, and the optical signal output from each output port can work in a coherent system.

Further, the power loss of the optical signal output from each output port may also be calculated according to a broadcast state included in the determined output statuses of the optical switch cells between each input port and the corresponding output port; and power compensation is performed according to the calculated power loss of the optical signal output from each output port, so that powers of optical signals output from all the output ports are the same.

Figure 8:
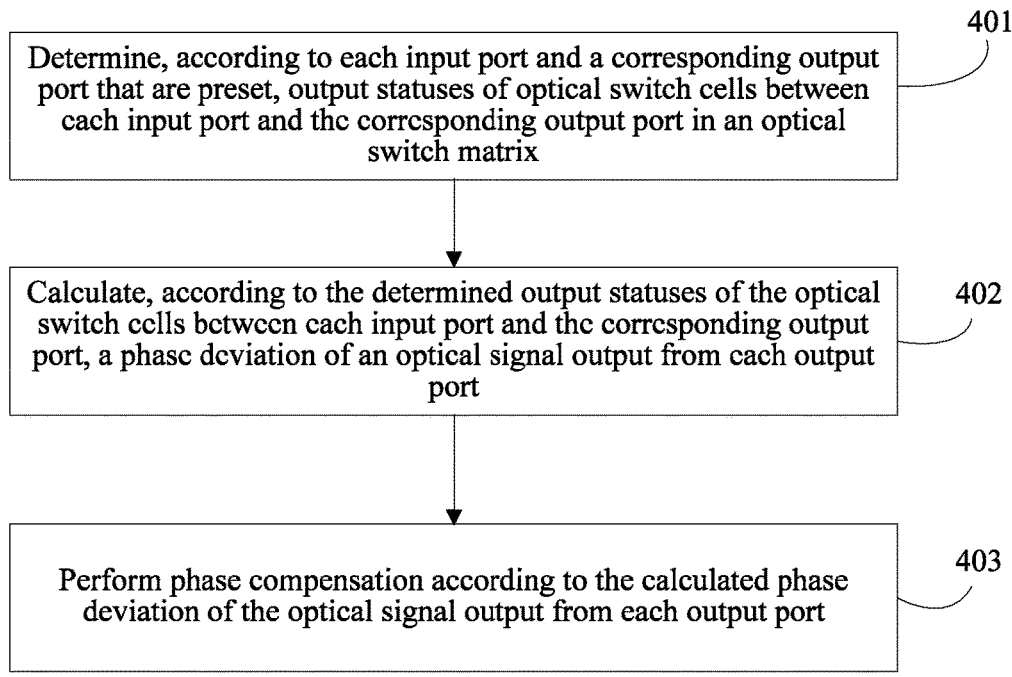
FIG. 8 is a schematic flowchart of an optical switch matrix control method according to an embodiment of the present invention.

Based on the optical switch matrix shown in FIG. 4, FIG. 8 is a schematic flowchart of an optical switch matrix control method according to an embodiment of the present invention. As shown in FIG. 8, the method includes:

401: Determine, according to each input port and a corresponding output port that are preset, output statuses of optical switch cells between each input port and the corresponding output port in the optical switch matrix.

For example, when an optical switch cell is in a crossover state, in this case, a phase difference between an optical signal output from an output port and an optical signal input from an input port is 90 degrees;

when an optical switch cell is in a straight-through state, in this case, a phase difference between an optical signal output from an output port and an optical signal input from an input port is 180 degrees; or when an optical switch cell is in a broadcast state, in this case, phase differences between optical signals output from two output ports and an optical signal input from an input port are both 135 degrees.

In an actual application, a non-coherent system is not sensitive to a phase change caused by an optical switching architecture; however, for a coherent system, impact on the system caused by a phase deviation between a finally output optical signal and an input optical signal must be considered, and therefore it is necessary to eliminate the phase deviation of the finally output optical signal, so that phases of the finally output optical signal and the input optical signal are the same.

In this embodiment, it is assumed that an input port and an output port for an optical signal in the optical switch matrix are preset; according to each input port and a corresponding output port that are preset, output statuses of optical switch cells between each input port and the corresponding output port in the optical switch matrix may be determined, and the determined output statuses of the optical switch cells between each input port and the corresponding output port may be stored into an optical switch control status table. In a case in which an architecture of the optical switch matrix is not changed, the output statuses of the optical switch cells between each input port and the corresponding output port may be quickly acquired by querying the optical switch control status table.

402: Calculate, according to the determined output statuses of the optical switch cells between each input port and the corresponding output port, a phase deviation of an optical signal output from each output port.

As shown in FIG. 4, after the output statuses of the optical switch cells 1, 5, 13, and 21 are determined, the output status of the optical switch cell 1 is straight-through output, that is, after the optical switch cell 1 is passed through, a phase difference between an output optical signal and an input optical signal is 180 degrees; after the optical switch cell 5 is passed through, phase differences between output optical signals and an input optical signal are both 135 degrees; after the optical switch cell 13 is passed through, a phase difference between an output optical signal and an input optical signal is 90 degrees; after the optical switch cell 21 is passed through, a phase difference between an output optical signal and an input optical signal is 180 degrees; therefore, an accumulated phase change of an optical signal finally output from a first output port is 180+135+90+180=360+225 (degrees).

403: Perform phase compensation according to the calculated phase deviation of the optical signal output from each output port.

As shown in FIG. 4, in this case, a phase shifter (such as an adjustable phase shifter 25) is used to perform phase compensation on a finally output optical signal, so that a phase of the optical signal output from the first output port is the same as a phase of an optical signal input from a first input port.

In this embodiment of the present invention, according to each input port and a corresponding output port that are preset, output statuses of optical switch cells between each input port and the corresponding output port in the optical switch matrix are determined; a phase deviation of an optical signal output from each output port is calculated according to the determined output statuses of the optical switch cells between each input port and the corresponding output port; and power compensation is performed according to the calculated phase deviation of the optical signal output from each output port. In this way, a phase of the optical signal output from each output port is the same as a phase of an optical signal input from an input port corresponding to the output port, and the optical signal output from each output port can work in a coherent system.

Figure 9:
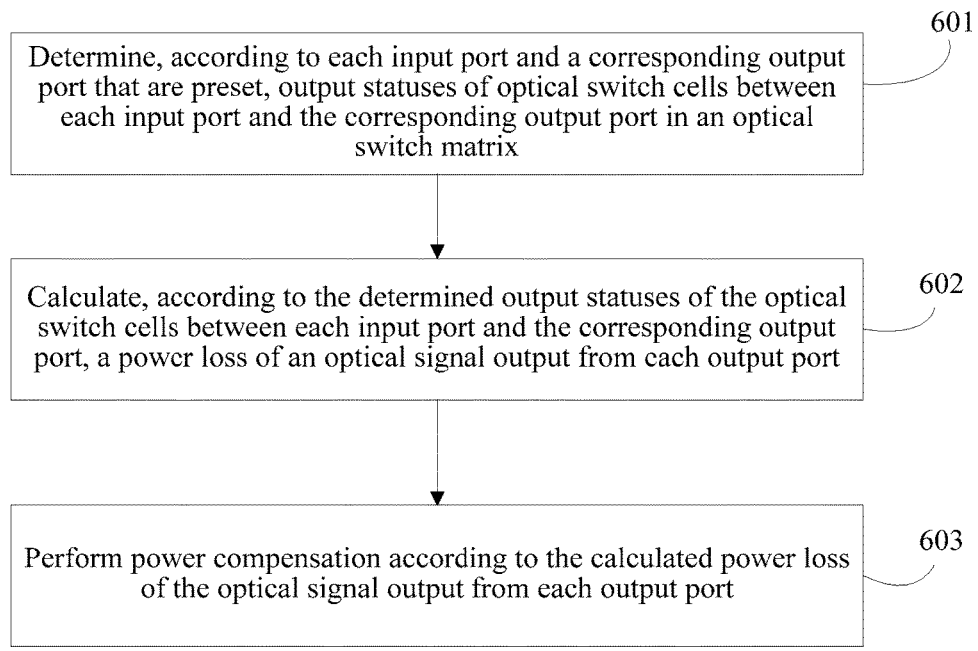
FIG. 9 is a schematic flowchart of an optical switch matrix control method according to another embodiment of the present invention.

Based on the optical switch matrix shown in FIG. 5 or FIG. 6, FIG. 9 is a schematic flowchart of an optical switch matrix control method according to another embodiment of the present invention. As shown in FIG. 9, the method includes:

601: Determine, according to each input port and a corresponding output port that are preset, output statuses of optical switch cells between each input port and the corresponding output port in the optical switch matrix.

As shown in FIG. 5, descriptions are provided by using an example in which an optical signal input from a first input port is broadcast to four output ports (1, 2, 3, and 4). To achieve a broadcast state at this moment, at least 11 optical switch cells, that is, 1, 5, 9, 13, 14, 17, 18, 21, 22, 23, and 24, are controlled, where output statuses of the optical switch cells 1, 5, and 9 are a broadcast state, and output statuses of the other eight optical switch cells are a crossover state or a straight-through state.

602: Calculate, according to the determined output statuses of the optical switch cells between each input port and the corresponding output port, a power loss of an optical signal output from each output port.

In the broadcast state, an optical signal input from an input port is output from two output ports, so that a power of an optical signal output from each output port reduces by half relative to a power of the input optical signal. In an actual application, in the crossover state or the straight-through state, an optical switch cell also has an insertion loss, and therefore power equalization processing must be performed at an output end.

603: Perform power compensation according to the calculated power loss of the optical signal output from each output port.

The output statuses of the optical switch cells between each input port and the corresponding output port are different, and therefore a problem that powers of optical signals output from different output ports are unequal exists. As shown in FIG. 5, a power equalizer may be added before each output port to resolve a problem of an unequal output power.

In this embodiment of the present invention, according to each input port and a corresponding output port that are preset, output statuses of optical switch cells between each input port and the corresponding output port in the optical switch matrix are determined; a power loss of an optical signal output from each output port is calculated according to the determined output statuses of the optical switch cells between each input port and the corresponding output port; and power compensation is performed according to the calculated power loss of the optical signal output from each output port, so that powers of optical signals output from output ports are the same.

Figure 10:
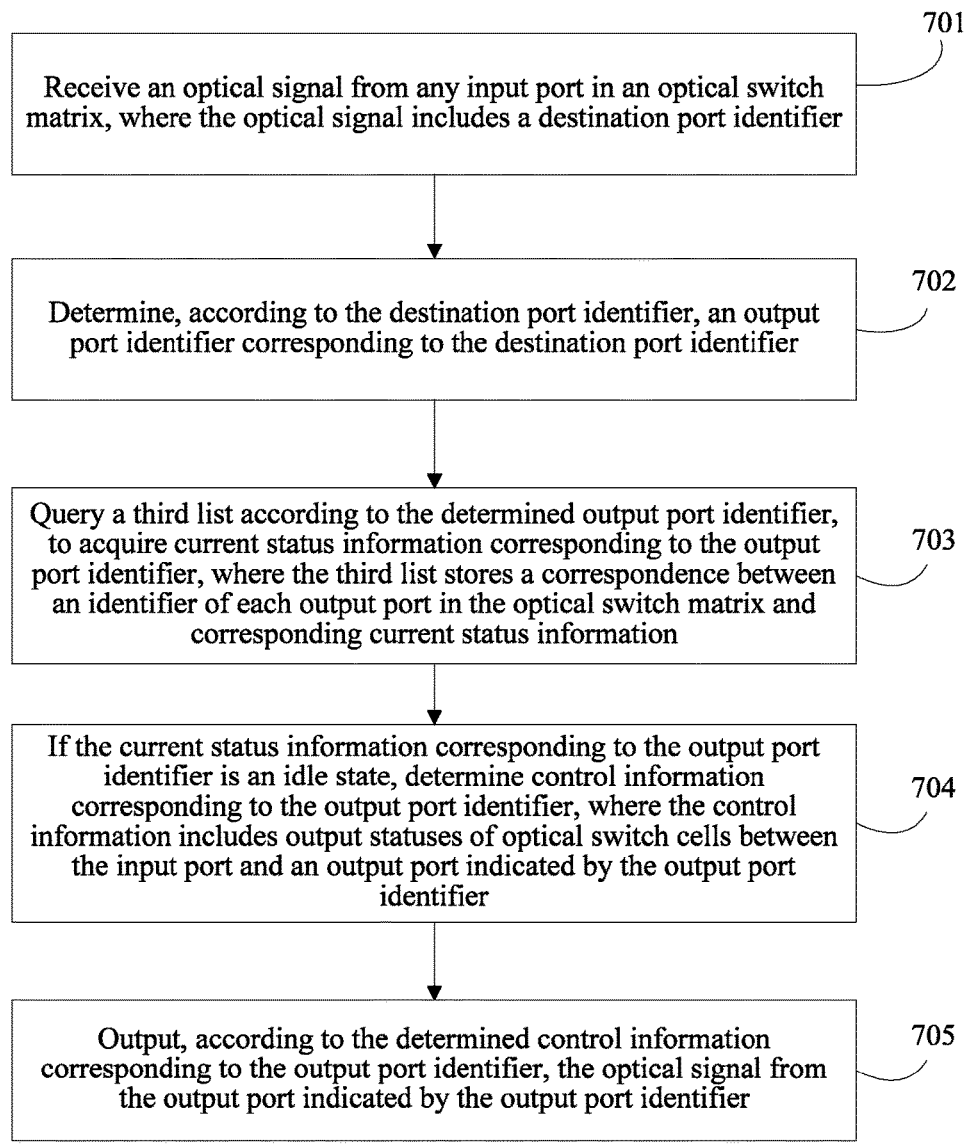
FIG. 10 is a schematic flowchart of an optical signal control method according to another embodiment of the present invention.

FIG. 10 is a schematic flowchart of an optical signal control method according to another embodiment of the present invention. As shown in FIG. 10, the method includes:

701: Receive an optical signal from any input port in an optical switch matrix, where the optical signal includes a destination port identifier.

Figure 11:
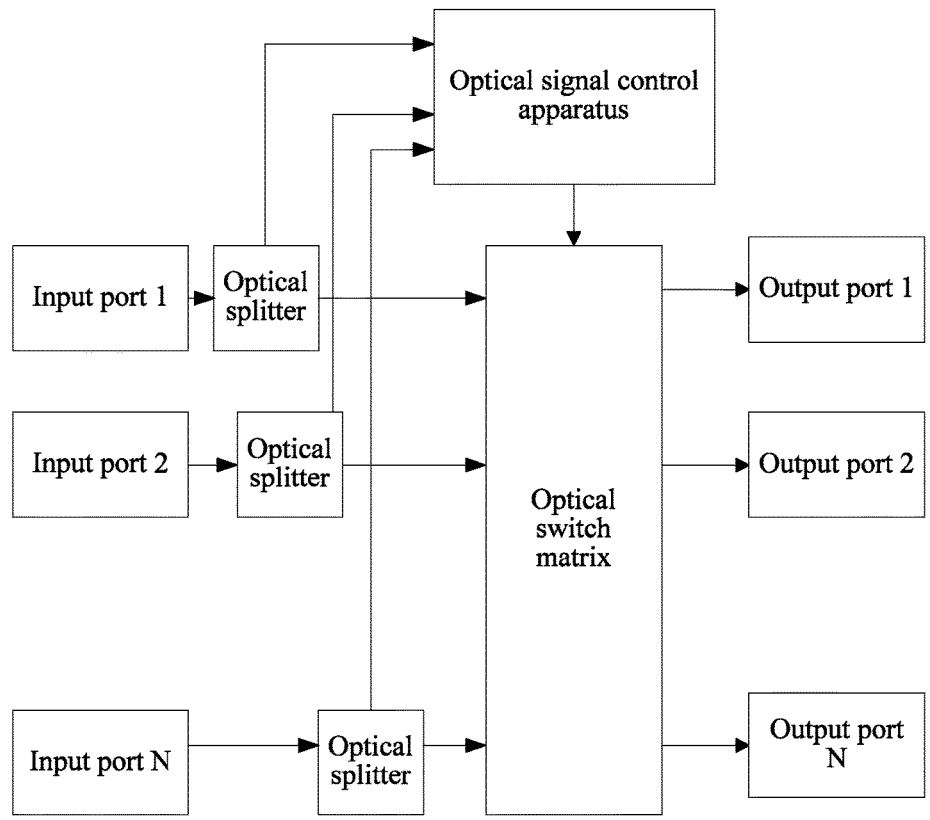
FIG. 11 is an architectural diagram of a switching network that includes an optical switch matrix applied in the embodiment shown in FIG. 10.

FIG. 11 is an architectural diagram of a switching network that includes the optical switch matrix applied in the embodiment shown in FIG. 10. As shown in FIG. 11, the switching network includes the optical switch matrix and an optical signal control apparatus, where the optical switch matrix includes N input ports and N output ports, and after an optical signal from any input port of the N input ports passes through a 10:90 optical splitter, 10% of the optical signal enters the optical signal control apparatus.

Optical information in this embodiment includes optical payload information and label information, where an in-band transmission or out-of-band transmission manner may be used for the label information and the optical payload information.

Table 1 shows a format of the label information in the optical information in this embodiment. As shown in Table 1, because an optical switch cell in this embodiment has broadcast and switching functions, for the format of the label information in the optical information in this embodiment, a destination port identifier (a destination ID) is added on the basis of an existing format of label information in optical information.

| Preamble | Start symbol | Length | TTL | Destination ID | FCS |
|---|---|---|---|---|---|

The destination ID is used to indicate a destination port to which the optical information needs to be sent. It should be noted that, the destination ID includes a broadcast identifier, a multicast identifier, and a unicast identifier.

For example, to identify the destination port identifier, in this embodiment, when all bits in a field of the destination port identifier are 1, the destination port identifier indicates the broadcast identifier; when a highest bit in the field of the destination port identifier is not 1, the destination port identifier indicates the unicast identifier; and when the highest bit in the field of the destination port identifier is 1, the destination port identifier indicates the multicast identifier.

Further, for example, a first list and a second list are set in this embodiment, where the first list stores a correspondence between each output port identifier and a corresponding unicast identifier, and the second list stores a correspondence between each multicast identifier and corresponding multiple output port identifiers.

Table 2 is a table of a correspondence between a unicast identifier and a destination output port in the first list.

| Group ID | Destination port |
|---|---|
| 0x . . . x001 | 1 |
| 0x . . . x011 | 2 |
| 0x . . . x100 | 3 |
| . . . | |

Table 3 is a table of a correspondence between a multicast identifier and destination output ports in the second list.

| Group ID | Destination port |
|---|---|
| 1x . . . x001 | 1, 2, 3 |
| 1x . . . x010 | 4, 5, 6, 7, 8 |
| 1x . . . x100 | 1, 3 |
| . . . | |

702: Determine, according to the destination port identifier, an output port identifier corresponding to the destination port identifier.

For example, if the destination port identifier is a broadcast identifier, it is determined, according to the broadcast identifier, that an output port identifier corresponding to the broadcast identifier is an identifier of each output port in the optical switch matrix; or if the destination port identifier is a unicast identifier, the first list is queried according to the unicast identifier, to determine an output port identifier corresponding to the unicast identifier; or if the destination port identifier is a multicast identifier, the second list is queried according to the multicast identifier, to determine multiple output port identifiers corresponding to the multicast identifier.

703: Query a third list according to the determined output port identifier, to acquire current status information corresponding to the output port identifier, where the third list stores a correspondence between an identifier of each output port in the optical switch matrix and corresponding current status information.

For example, the third list is also set in this embodiment, where the third list stores a correspondence between an identifier of each output port in the optical switch matrix and current status information of an output port corresponding to the identifier. A current status of an output port includes an idle state or an occupied state.

After the output port identifier corresponding to the destination port identifier is determined in step 702, the third list may be queried, to acquire the current status information corresponding to the output port identifier.

704: If the current status information corresponding to the output port identifier is an idle state, determine control information corresponding to the output port identifier, where the control information includes output statuses of optical switch cells between the input port and an output port indicated by the output port identifier.

To avoid a destination port conflict, control information of an output port is determined only when current status information of the output port is an idle state. The control information includes output statuses of optical switch cells between an input port and the output port, and is used to control voltages applied on the optical switch cells between the input port and the output port in the optical switch matrix, so that the optical switch cells between the input port and the output port perform, according to respective output statuses of the optical switch cells, optical signal switching or broadcast path establishment.

The output status includes the broadcast state, the straight-through state, and the crossover state in the embodiment shown in FIG. 1, and details are not described again.

Specifically, if the destination port identifier is a unicast identifier, there is only one output port identifier corresponding to the unicast identifier, and only whether current status information of an output port is an idle state needs to be determined. If the current status information of the output port is the idle state, the control information corresponding to the output port is determined; or if the current status information of the output port is an occupied state, it indicates that a conflict occurs at the output port. In this embodiment, a destination port identifier in an optical signal may also be changed to a destination port identifier corresponding to an output port that is in an idle state, to perform routing deflection, and control information corresponding to the output port after the change is then determined.

If the destination port identifier is a multicast identifier, there are at least two output port identifiers corresponding to the multicast identifier. In this case, whether current status information of output ports corresponding to the multicast identifier is an idle state needs to be determined. If an output port in an idle state exists in the output ports corresponding to the multicast identifier, control information corresponding to the output port in the idle state is determined. If one output port in an occupied state exists in the output ports corresponding to the multicast identifier, in this embodiment, the output port, in the occupied state, among the original output ports corresponding to the multicast identifier may be changed to an output port in an idle state, and then a unicast identifier corresponding to the output port in the idle state after the change may be used as a destination port identifier in an optical signal, to perform routing deflection, and control information corresponding to the output port after the change is then determined. If two or more output ports in an occupied state exist in the output ports corresponding to the multicast identifier, in this embodiment, multiple output ports, in the occupied state, among the original output ports corresponding to the multicast identifier may be changed to other multiple output ports in an idle state, and then a multicast identifier corresponding to the multiple output ports in the idle state after the change may be used as a destination port identifier in an optical signal, to perform routing deflection, and the multiple output ports in the idle state after the change and the multicast identifier corresponding to the multiple output ports after the change may be further stored into the second list.

If the destination port identifier is a broadcast identifier, output ports corresponding to the broadcast identifier are all output ports. In this case, current status information of each output port needs to be acquired. If an output port in an idle state exists, control information corresponding to the output port in the idle state is determined.

It should be noted that, to avoid a destination port conflict, after the control information corresponding to the output port identifier is determined, the current status information, in the third list, of the output port corresponding to the output port identifier needs to be set to the occupied state.

705: Output, according to the determined control information corresponding to the output port identifier, the optical signal from the output port indicated by the output port identifier.

The control information is used to control the voltages applied on the optical switch cells between the input port and the output port in the optical switch matrix, so that the optical switch cells between the input port and the output port perform, according to respective output statuses of the optical switch cells, optical signal switching or broadcast path establishment, and then an optical signal may be output, by using a switching or broadcast path established by the optical switch cells between the input port and the output port, from the output port indicated by the output port identifier. Afterward, the current status information, in the third list, of the output port corresponding to the output port identifier needs to be set to the idle state.

In this embodiment of the present invention, a destination port identifier included in an optical signal is received from any input port in the optical switch matrix, and an output port identifier corresponding to the destination port identifier is determined according to the destination port identifier. A third list is queried according to the determined output port identifier, to acquire current status information corresponding to the output port identifier, where the third list stores a correspondence between an identifier of each output port in the optical switch matrix and corresponding current status information. If the current status information corresponding to the output port identifier is an idle state, control information corresponding to the output port identifier is determined, where the control information includes output statuses of optical switch cells between the input port and an output port indicated by the output port identifier. The optical signal is output, according to the determined control information corresponding to the output port identifier, from the output port indicated by the output port identifier. In this way, optical signal broadcast or switching may be implemented by using a broadcast or switching path established in the optical switch matrix.

Figure 12:
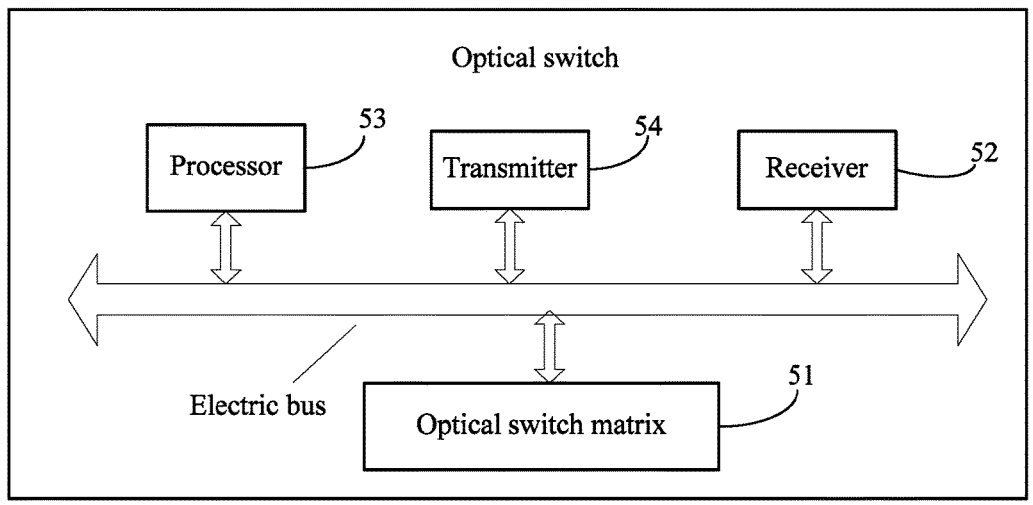
FIG. 12 is a schematic structural diagram of an optical switch according to another embodiment of the present invention.

FIG. 12 is a schematic structural diagram of an optical switch according to another embodiment of the present invention. As shown in FIG. 12, the optical switch includes an optical switch matrix 51 that includes multiple optical switch cells described in the embodiment shown in FIG. 1 or FIG. 2, a receiver 52, a processor 53, and a transmitter 54, where the receiver 52 is connected to each input port in the optical switch matrix 51 by using an optical fiber, the processor 53 is connected to the receiver 52 and the transmitter 54 by using an electric bus, and the transmitter 54 is connected to the optical switch matrix 51 by using the electric bus;

the receiver 52 is configured to receive an optical signal from any input port in the optical switch matrix, where the optical signal includes a destination port identifier;

the processor 53 is configured to determine, according to the destination port identifier included in the optical signal that is received by the receiver, the output port identifier corresponding to the destination port identifier;

the processor 53 is further configured to query a third list according to the determined output port identifier, to acquire current status information corresponding to the output port identifier, where the third list stores a correspondence between an identifier of each output port in the optical switch matrix and corresponding current status information;

the processor 53 is further configured to: if the current status information corresponding to the output port identifier is an idle state, determine control information corresponding to the output port identifier, where the control information includes output statuses of optical switch cells between the input port and an output port indicated by the output port identifier;

the transmitter 54 is configured to send, to the optical switch matrix, the determined control information corresponding to the output port identifier; and the optical switch matrix 51 is configured to enable, according to the control information corresponding to the output port identifier, the optical signal to pass through the optical switch cells between the input port and the output port indicated by the output port identifier, to output the optical signal from the output port indicated by the output port identifier.

For example, the processor 53 is specifically configured to:

if the destination port identifier is a broadcast identifier, determine, according to the broadcast identifier, that an output port identifier corresponding to the broadcast identifier is an identifier of each output port in the optical switch matrix; or if the destination port identifier is a unicast identifier, query a first list according to the unicast identifier, to determine an output port identifier corresponding to the unicast identifier, where the first list stores a correspondence between each output port identifier and a corresponding unicast identifier; or if the destination port identifier is a multicast identifier, query a second list according to the multicast identifier, to determine multiple output port identifiers corresponding to the multicast identifier, where the second list stores a correspondence between each multicast identifier and corresponding multiple output port identifiers.

For example, the processor 53 is further configured to: after determining the control information corresponding to the output port identifier, set the current status information, in the third list, of the output port corresponding to the output port identifier to an occupied state.

For example, the processor 53 is further configured to: after the optical switch matrix outputs, according to the determined control information corresponding to the output port identifier, the optical signal from the output port indicated by the output port identifier, set the current status information, in the third list, of the output port corresponding to the output port identifier to the idle state.

In this embodiment of the present invention, a destination port identifier included in an optical signal is received from any input port in the optical switch matrix, and an output port identifier corresponding to the destination port identifier is determined according to the destination port identifier. A third list is queried according to the determined output port identifier, to acquire current status information corresponding to the output port identifier, where the third list stores a correspondence between an identifier of each output port in the optical switch matrix and corresponding current status information. If the current status information corresponding to the output port identifier is an idle state, control information corresponding to the output port identifier is determined, where the control information includes output statuses of optical switch cells between the input port and an output port indicated by the output port identifier. The optical signal is output, according to the determined control information corresponding to the output port identifier, from the output port indicated by the output port identifier. In this way, optical signal broadcast or switching may be implemented by using a broadcast or switching path established in the optical switch matrix.

Figure 13:
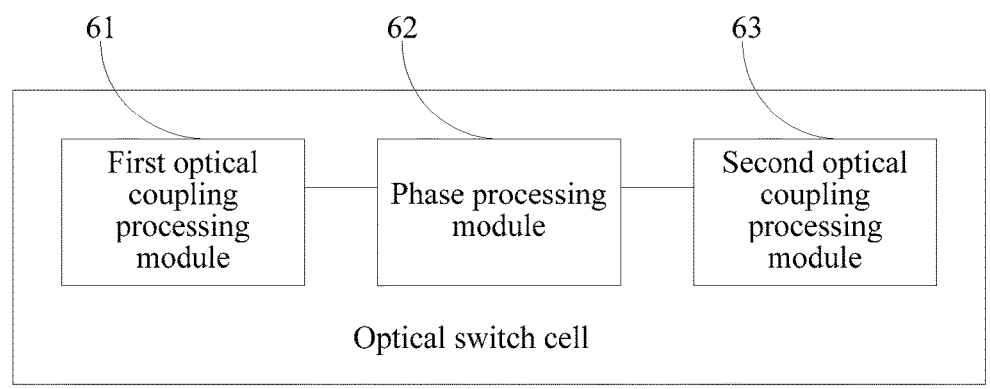
FIG. 13 is a schematic structural diagram of an optical switch cell according to another embodiment of the present invention.

FIG. 13 is a schematic structural diagram of an optical switch cell according to another embodiment of the present invention. As shown in FIG. 13, the optical switch cell includes:

a first optical coupling processing module 61, configured to perform optical coupling processing on an input optical signal, to split the input optical signal into two paths of optical signals; during specific implementation, the first optical coupler described in the embodiment shown in FIG. 1 or FIG. 2 may be used for implementation;

a phase processing module 62, configured to perform phase processing on the two paths of optical signals obtained by means of splitting by the first optical coupling processing module 61, so that a phase difference exists between the two paths of optical signals; during specific implementation, the first phase shifter described in the embodiment shown in FIG. 1 may be used for implementation, or the first phase shifter and the second phase shifter described in the embodiment shown in FIG. 2 may be used for implementation; and a second optical coupling processing module 63, configured to perform optical coupling processing on the two paths of optical signals that have been processed by the phase processing module 62 and between which the phase difference exists, to output an optical signal from a first output port and/or a second output port; during specific implementation, the second optical coupler in the embodiment shown in FIG. 1 or FIG. 2 may be used for implementation.

Optionally, the second optical coupling processing module 61 is specifically configured to:

if the phase difference is a first phase difference, perform optical coupling processing on the two paths of optical signals to output an optical signal from the second output port;

if the phase difference is a second phase difference, perform optical coupling processing on the two paths of optical signals to output an optical signal from the first output port; or if the phase difference is a third phase difference, perform optical coupling processing on the two paths of optical signals to output optical signals from the first output port and the second output port.

Optionally, a range of the first phase difference is −5 degrees to 5 degrees, a range of the second phase difference is 175 degrees to 185 degrees, and a range of the third phase difference is 85 degrees to 95 degrees or is 265 degrees to 275 degrees.

In this embodiment of the present invention, optical coupling processing is performed on an optical signal input from an input port to split the optical signal into two paths of optical signals, and phase processing is performed on the two paths of optical signals, so that a phase difference exists between the two paths of optical signals on which phase processing has been performed; and then optical coupling processing is performed on the two paths of optical signals to output an optical signal from a first output port and/or a second output port according to the phase difference, which can implement crossover output, straight-through output, or broadcast output of an optical signal. In this embodiment, by performing only voltage control on a phase shifter that performs phase processing, an input optical signal can be split into two paths of optical signals with a different phase difference. A time of the voltage control is short, and a jitter is not easily caused, and therefore an output signal is stable, and a reaction speed is high, which can resolve a problem of a low reaction speed of an existing optical switch cell that exists when the optical switch cell implements optical signal broadcast.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The foregoing integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The foregoing software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a removable hard disk, a read-only memory (Read-Only Memory in English, ROM for short), a random access memory (Random Access Memory in English, RAM for short), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof; however, these modifications or replacements do not make the essence of corresponding technical solutions depart from the scope of the technical solutions in the embodiments of the present invention.

What is claimed is:

1. An optical switch cell, comprising: a first input port, a first phase shifter, a first output port, a second output port, a first optical coupler, and a second optical coupler, wherein the first input port is connected to one end of the first optical coupler, the other end of the first optical coupler is connected to one end of the first phase shifter and connected to one end of the second optical coupler, the other end of the first phase shifter is connected to the one end of the second optical coupler, and the other end of the second optical coupler is connected to the first output port and the second output port;

the first optical coupler is configured to perform optical coupling processing on an optical signal input from the first input port, to split the optical signal into two paths of optical signals, wherein one path of optical signal is input to the first phase shifter, and the other path of optical signal is input to the second optical coupler;

the first phase shifter is configured to perform phase processing on the one path of optical signal, so that a phase difference exists between the one path of optical signal on which the first phase shifter has performed phase processing and the other path of optical signal that is input to the second optical coupler; and the second optical coupler is configured to perform optical coupling processing on the two paths of optical signals between which the phase difference exists, to output an optical signal from the first output port and/or the second output port.

2. An optical switch matrix, comprising:

N input ports arranged on an input side of the optical switch matrix, wherein N is an integer greater than 2;

N output ports arranged on an output side of the optical switch matrix; and multiple optical switch cells that interconnect any input port of the N input ports to any output port of the N output ports, wherein the optical signal received at one input port of the N input ports passes through one or more optical switch cells of the multiple optical switch cells, and reaches one output port of the N output ports; and the optical switch cells are the optical switch cell according to claim 1, and the multiple optical switch cells are connected to each other by using a transmission medium, wherein the transmission medium is used to transmit an optical signal.

3. An optical switch, comprising: a processor and the optical switch matrix according to claim 2, wherein the processor is connected to the optical switch matrix by using an electric bus; and the processor is configured to determine, according to each input port and a corresponding output port that are preset in the optical switch matrix, output status information of optical switch cells between each input port and the corresponding output port in the optical switch matrix.

4. An optical switch, comprising the optical switch matrix according to claim 2, a receiver, a processor, and a transmitter, wherein the receiver is connected to each input port in the optical switch matrix by using an optical fiber, the processor is connected to the receiver and the transmitter by using an electric bus, and the transmitter is connected to the optical switch matrix by using the electric bus;

the receiver is configured to receive an optical signal from any input port in the optical switch matrix, wherein the optical signal comprises a destination port identifier, and the destination port identifier is used to indicate an output port identifier;

the processor is configured to determine, according to the destination port identifier comprised in the optical signal that is received by the receiver, the output port identifier corresponding to the destination port identifier, and determine, according to the output port identifier, control information corresponding to the output port identifier, wherein the control information comprises output status information of optical switch cells between the input port and an output port indicated by the output port identifier;

the transmitter is configured to send, to the optical switch matrix, the determined control information corresponding to the output port identifier; and the optical switch matrix is configured to enable, according to the control information corresponding to the output port identifier, the optical signal to pass through the optical switch cells between the input port and the output port indicated by the output port identifier, to output the optical signal from the output port indicated by the output port identifier.

5. The optical switch according to claim 3, wherein:

the output status information of the optical switch cell comprises a broadcast state, a straight-through state, or a crossover state, wherein in the broadcast state, an optical signal is input from an input port of the optical switch cell, and optical signals are output from a first output port and a second output port of the optical switch cell;

in the straight-through state, an optical signal is input from an input port of the optical switch cell, and an optical signal is output from a first output port of the optical switch cell; or in the crossover state, an optical signal is input from an input port of the optical switch cell, and an optical signal is output from a second output port of the optical switch cell.

6. The optical switch according to claim 3, further comprising:

multiple power equalizers, wherein the multiple power equalizers each are connected to each output port in the optical switch matrix, wherein the processor is further configured to calculate, according to the determined output statuses of the optical switch cells between each input port and the corresponding output port, a power loss of the path of optical signal output from each output port, generate a power equalizer control signal by means of calculation according to a value of the power loss, and send the control signal to a power equalizer connected to the corresponding output port; and the power equalizer is configured to perform power compensation according to the power loss, sent by the processor, of the optical signal output from the output port connected to the power equalizer.

7. The optical switch according to claim 3, further comprising: multiple adjustable phase shifters, wherein the multiple adjustable phase shifters each are connected to each output port in the optical switch matrix;

the processor is further configured to calculate, according to the determined output statuses of the optical switch cells between each input port and the corresponding output port, a phase deviation of the path of optical signal output from each output port, and send, to an adjustable phase shifter connected to the corresponding output port, the phase deviation of the optical signal output from each output port; and the adjustable phase shifter is configured to perform phase compensation according to the phase deviation, sent by the processor, of the optical signal output from the output port connected to the adjustable phase shifter.

8. The optical switch according to claim 4, wherein:

the processor is further configured to query a third list according to the determined output port identifier, to acquire current status information corresponding to the output port identifier, wherein the third list stores a correspondence between an identifier of each output port in the optical switch matrix and corresponding current status information; and the processor is further configured to: if the current status information corresponding to the output port identifier is an idle state, determine the control information corresponding to the output port identifier.

9. The optical switch according to claim 4, wherein the processor is specifically configured to:

if the destination port identifier is a broadcast identifier, determine, according to the broadcast identifier, that an output port identifier corresponding to the broadcast identifier is an identifier of each output port in the optical switch matrix; or if the destination port identifier is a unicast identifier, query a first list according to the unicast identifier, to determine an output port identifier corresponding to the unicast identifier, wherein the first list stores a correspondence between each output port identifier and a corresponding unicast identifier; or if the destination port identifier is a multicast identifier, query a second list according to the multicast identifier, to determine multiple output port identifiers corresponding to the multicast identifier, wherein the second list stores a correspondence between each multicast identifier and corresponding multiple output port identifiers.

10. The optical switch according to claim 4, wherein the processor is further configured to: after determining the control information corresponding to the output port identifier, set the current status information, in the third list, of the output port corresponding to the output port identifier to an occupied state.

11. The optical switch according to claim 4, wherein the processor is further configured to: after the optical switch matrix outputs, according to the determined control information corresponding to the output port identifier, the optical signal from the output port indicated by the output port identifier, set the current status information, in the third list, of the output port corresponding to the output port identifier to the idle state.

12. An optical switch matrix control method, comprising:

determining, according to each input port and a corresponding output port that are preset in an optical switch matrix, output statuses of optical switch cells between each input port and the corresponding output port in the optical switch matrix;

calculating, according to the determined output status information of the optical switch cells between each input port and the corresponding output port, a power loss of an optical signal output from each output port; and performing power compensation according to the calculated power loss of the optical signal output from each output port.

13. The method according to claim 12, after the determining output statuses of optical switch cells between each input port and the corresponding output port in the optical switch matrix, further comprising:

calculating, according to the determined output status information of the optical switch cells between each input port and the corresponding output port, a phase deviation of the optical signal output from each output port; and performing phase compensation according to the calculated phase deviation of the optical signal output from each output port.

14. The method according to claim 12, wherein the output status information of the optical switch cell comprises a broadcast state, a straight-through state, or a crossover state, wherein in the broadcast state, an optical signal is input from an input port of the optical switch cell, and optical signals are output from a first output port and a second output port of the optical switch cell;

in the straight-through state, an optical signal is input from an input port of the optical switch cell, and an optical signal is output from a first output port of the optical switch cell; or in the crossover state, an optical signal is input from an input port of the optical switch cell, and an optical signal is output from a second output port of the optical switch cell.

15. An optical signal control method, comprising:

receiving an optical signal input from any input port in an optical switch matrix, wherein the optical signal comprises a destination port identifier, and the destination port identifier is used to indicate an output port identifier;

determining, according to the destination port identifier, the output port identifier corresponding to the destination port identifier;

determining, according to the output port identifier, control information corresponding to the output port identifier, wherein the control information comprises output status information of optical switch cells between the input port and an output port indicated by the output port identifier; and sending, to the optical switch matrix, the determined control information corresponding to the output port identifier, so that the optical switch matrix enables, according to the control information corresponding to the output port identifier, the optical signal to pass through the optical switch cells between the input port and the output port indicated by the output port identifier, to output the optical signal from the output port indicated by the output port identifier.

16. The method according to claim 15, wherein the determining, according to the output port identifier, control information corresponding to the output port identifier comprises:

querying a third list according to the output port identifier, to acquire current status information corresponding to the output port identifier, wherein the third list stores a correspondence between an identifier of each output port in the optical switch matrix and corresponding current status information; and if the current status information corresponding to the output port identifier is an idle state, determining the control information corresponding to the output port identifier.

17. The method according to claim 15, wherein the determining, according to the destination port identifier, the output port identifier corresponding to the destination port identifier comprises:

if the destination port identifier is a broadcast identifier, determining, according to the broadcast identifier, that an output port identifier corresponding to the broadcast identifier is an identifier of each output port in the optical switch matrix; or if the destination port identifier is a unicast identifier, querying a first list according to the unicast identifier, to determine an output port identifier corresponding to the unicast identifier, wherein the first list stores a correspondence between each output port identifier and a corresponding unicast identifier; or if the destination port identifier is a multicast identifier, querying a second list according to the multicast identifier, to determine multiple output port identifiers corresponding to the multicast identifier, wherein the second list stores a correspondence between each multicast identifier and corresponding multiple output port identifiers.

18. The method according to claim 15, after the determining the control information corresponding to the output port identifier, comprising:

setting the current status information, in the third list, of the output port corresponding to the output port identifier to an occupied state.

19. The method according to claim 15, after the optical signal is output, according to the determined control information corresponding to the output port identifier, from the output port indicated by the output port identifier, comprising:

setting the current status information, in the third list, of the output port corresponding to the output port identifier to the idle state.

* * * * *